United States Patent
Cecchinato et al.

(10) Patent No.: US 12,197,239 B2
(45) Date of Patent: Jan. 14, 2025

(54) APPARATUS FOR PRESSURE REGULATING

(71) Applicant: PIETRO FIORENTINI S.p.A., Arcugnano (IT)

(72) Inventors: Umberto Cecchinato, Quinto Vicentino (IT); Nevio Zampieri, Montegalda (IT); Claudio Imboccioli, Creazzo (IT)

(73) Assignee: PIETRO FIORENTINI S.P.A., Arcugnano (IT)

( * ) Notice: Subject to any disclaimer, the term of this patent is extended or adjusted under 35 U.S.C. 154(b) by 20 days.

(21) Appl. No.: 17/927,787

(22) PCT Filed: May 27, 2021

(86) PCT No.: PCT/IB2021/054644
§ 371 (c)(1),
(2) Date: Nov. 25, 2022

(87) PCT Pub. No.: WO2021/240430
PCT Pub. Date: Dec. 2, 2021

(65) Prior Publication Data
US 2023/0229179 A1     Jul. 20, 2023

(30) Foreign Application Priority Data
May 29, 2020    (IT) .................. 102020000012916

(51) Int. Cl.
*G05D 16/16*        (2006.01)
*F17D 5/00*         (2006.01)

(52) U.S. Cl.
CPC ........... *G05D 16/166* (2013.01); *F17D 5/005* (2013.01); *G05D 16/163* (2013.01); *Y10T 137/7762* (2015.04)

(58) Field of Classification Search
CPC .................... Y10T 137/7768; Y10T 137/7762
See application file for complete search history.

(56) References Cited

U.S. PATENT DOCUMENTS 2,309,848 A     2/1943    King
4,172,466 A *   10/1979    Pattarini ............... F16K 31/383
                                                         137/488

(Continued)

FOREIGN PATENT DOCUMENTS

EP          2757432 A2     7/2014

*Primary Examiner* — Robert K Arundale
(74) *Attorney, Agent, or Firm* — Carmel Patent Agency; Robert Ballarini

(57) ABSTRACT

Apparatus for regulating gas pressure suitable for use in systems and/or networks for transport and/or distribution of gas, the apparatus configured to be connected upstream with an inlet duct for the gas and downstream with an outlet duct, and includes:

a main regulator including:
       an inlet area fluidically connectable with the inlet,
       an outlet area fluidically connectable with the outlet,
       a shutter which acts between the inlet area and the outlet area,
       means configured to push the shutter towards a closed position,
       a motorization chamber in which a movable element is housed,
    a pilot regulator including:
       an inlet which is fluidically connected with a first sub-chamber, to thus allow the passage of gas from the first sub-chamber towards an inlet of the pilot regulator,
       an outlet which is fluidically connected to said second sub-chamber, and
       at least one pilot valve.

18 Claims, 10 Drawing Sheets

(56) References Cited

U.S. PATENT DOCUMENTS

| | | |
|---|---|---|
| 6,371,156 B1 | 4/2002 | Walton |
| 6,595,237 B2 | 7/2003 | Cecchinato et al. |
| 10,948,104 B2 * | 3/2021 | De Feo .............. F16K 37/0025 |
| 11,454,994 B2 * | 9/2022 | Imboccioli ................ F17D 3/01 |
| 2003/0098071 A1 * | 5/2003 | Cecchinato .......... G05D 16/163 |
| | | 137/488 |
| 2018/0275694 A1 * | 9/2018 | Imboccioli ........... G05D 16/163 |

* cited by examiner

APPARATUS FOR PRESSURE REGULATING

CROSS-REFERENCE TO RELATED APPLICATIONS

This application is a Section 371 U.S. National Phase of International Patent Application Number PCT/IB2021/054644, filed May 27, 2021, which claims priority of Italian Patent Application No. 102020000012916, filed May 29, 2020, the entire contents of all of which are incorporated by reference herein as if fully set forth.

FIELD OF THE INVENTION

The present invention relates to an apparatus for regulating gas pressure, and in particular of the type suitable for being used and installed in systems and/or networks for the transport and/or distribution of gas, such as natural gas or even gases produced in a manner decentralized, such as biomethane or hydrogen.

BACKGROUND

As is known, pressure regulation stations are provided in the gas transport and/or distribution networks to reduce the gas pressure from the supply value to the value required by the user, and also keep it stable at the predetermined value, and this also in in case of variations in upstream pressure or in case of variations in flow rate requested by the user.

In particular, the aforementioned pressure drop is obtained by means of pressure regulators, which are configured to maintain the outlet pressure equal to a preset calibration value, regardless of the gas flow rate delivered.

A known type of pressure regulator comprises a conduit of the gas passage having:
  an upstream end communicating with the high pressure branch of the transport and/or distribution network, and
  the opposite end of the valley communicating with the low pressure branch which is directed towards the user.

In the gas passage duct there is a shutter, which causes a restriction in the passage section of the duct itself, so as to cause a reduction in gas pressure between the upstream and downstream of the shutter. In particular, the pressure reduction takes place by lamination of the gas in correspondence with the passage section on which the shutter acts.

Conveniently, the shutter is movable so that the passage section, and therefore the pressure drop of the gas, can be modified according to the flow rate of the gas itself.

The movement of the shutter is controlled by a feedback system, which, in the presence of an increase in the pressure of the gas supplied downstream, (i.e. of the gas downstream of the regulator) compared to the calibration value, reduces the degree of opening of the shutter itself. The opposite occurs instead in the case of a pressure reduction.

Depending on the type of control envisaged, direct-acting pressure regulation devices and pilot-operated pressure regulating devices/devices are provided. In particular, a single regulator is provided in the direct-acting regulating devices whose degree of opening of the shutter—and in particular the degree of opening of the section for the passage of gas—is generated by the comparison between the pressure detected downstream (connected to the control head) which pushes on the movable wall (membrane) of the motorization chamber, and the thrust generated by the calibration spring. On the other hand, in the piloted-action regulation apparatuses there is a main regulator and an additional regulator, which is called "pilot regulator"; in particular, in these devices, the degree of opening of the shutter of the main regulator—and in particular of its section for the passage of gas—is controlled/commanded by the pilot regulator which, according to the compression value of its calibration spring and of the actual pressure detected downstream of the apparatus, provides the main regulator with a control pressure (motorization) suitable for bringing the apparatus into equilibrium.

Direct-acting regulating devices are simpler to build (in particular they have fewer components and fewer connections), however the level of regulation precision/accuracy is lower than with pilot-operated regulating devices. On the other hand, direct acting regulators have a much higher response speed to downstream load changes. For this reason, their applications are different: direct acting regulation devices are mainly used for medium and low pressure networks (such as civil and industrial distribution networks), with relatively low flow rates and more frequent load variations; on the other hand, piloted-action regulating apparatuses are mostly used for medium and high pressure networks, where higher flow rates are required and where the variations in the required flow rate are lower and less frequent (such as transport networks).

Furthermore, according to the expected behavior in the event of breakage of the control elements (generally of the rubber membranes), the traditional pressure regulation devices/apparatuses can be of the "Fail to Close" type or of the "Fail to Open" type. In particular, the devices/apparatuses of the "Fail to Close" type (hereinafter also referred to as "FTC"), in the event of breakage, are brought into a closed condition (i.e. the regulator shutter closes the gas passage section, thus blocking the flow of gas downstream), thus favoring the safety of the network; the devices/apparatuses of the "Fail to Open" type (hereinafter also referred to as "FTO"), in the event of breakage, are brought to the open condition (i.e. the regulator shutter opens the gas passage section, thus allowing downstream gas flow), thus favoring the continuity of the service.

Normally, for both of the above two configurations FTC or FTO, the presence of at least one safety device, such as a monitor regulator and/or a blocking device, is provided upstream of the regulation device.

Currently, the "Fail to Close" and "Fail to Open" type regulating devices/apparatuses differ substantially from each other both in the construction of the main regulator and in the control and connection system. In essence, therefore, the creation of dedicated and specific components is required according to the type of regulation device/apparatus that is required, ie FTC or FTO.

U.S. Pat. No. 6,371,156 relates to a pilot-operated regulation apparatus in which the input of the pilot regulator is connected directly with the upstream area of the main regulator and in which the motorization chamber of the main regulator comprises a first sub-chamber, which is connected to a first output of the pilot regulator, and a second sub-chamber which is connected with a second output of the pilot regulator. Therefore, the two sub-chambers of the main regulator always and only receive the gas that passes through and leaves the pilot regulator.

U.S. Pat. No. 2,309,848 relates to a pilot-operated regulation apparatus in which the input of the pilot regulator is directly connected to the upstream area of the main regulator and in which the motorization chamber of the main regulator comprises a first sub-chamber, which is connected to the output of the pilot regulator, and a second sub-chamber which is connected with the downstream area of the main regulator.

EP2757432 relates to a pilot-operated regulation apparatus in which the input of the pilot regulator is connected directly to the upstream area of the main regulator and in which the motorization chamber of the main regulator comprises a first sub-chamber, which is connected to the output of the pilot regulator, and a second sub-chamber which is connected with the upstream or downstream area of the main regulator.

The disclosure of this section is to provide background of the invention, Applicant acknowledges that any noted publications speak for themselves and that all other information and characterizations are not admitted by Applicant to constitute prior art.

SUMMARY

The object of the invention is to propose an apparatus for regulating the gas pressure, of the type to be installed in a gas transport and/or distribution network, which allows to overcome, in whole or in part, the drawbacks of the known solutions.

Another object of the invention is to propose an apparatus, which requires fewer components than known solutions.

Another object of the invention is to propose an apparatus, which has smaller dimensions and is therefore more compact than known solutions.

Another object of the invention is to propose an apparatus, which can be obtained simply, quickly and with low costs.

Another object of the invention is to propose an apparatus, which is in line with the regulations in force in the sector.

Another purpose of the invention is to propose an apparatus that is highly versatile, and that in particular can be easily and easily configured and adapted to operate in the "Fail to Close" or "Fail to Open" configuration, as well as to switch between said two configurations.

Another object of the invention is to propose an apparatus which allows a precise regulation of the pressure of the gas passing through it.

Another object of the invention is to propose an apparatus, which combines regulation reliability and speed of response to downstream pressure variations.

Another object of the invention is to propose an apparatus, which is highly safe and reliable.

Another purpose of the invention is to propose an apparatus which is an improvement and/or alternative to the traditional ones.

Another object of the invention is to propose an apparatus, which presents an alternative characterization, both in constructive and functional terms, with respect to the traditional ones.

All the purposes mentioned herein, considered both individually and in any combination thereof, and others still which will result from the following description, are achieved, according to the invention, with an apparatus as defined in the appended claims.

BRIEF DESCRIPTION OF THE DRAWINGS

The present invention is further below clarified in some of its preferred embodiments reported for purely illustrative and non-limiting purposes with reference to the attached drawings, in which.

DETAILED DESCRIPTION OF THE PREFERRED EMBODIMENTS

Figure 1:
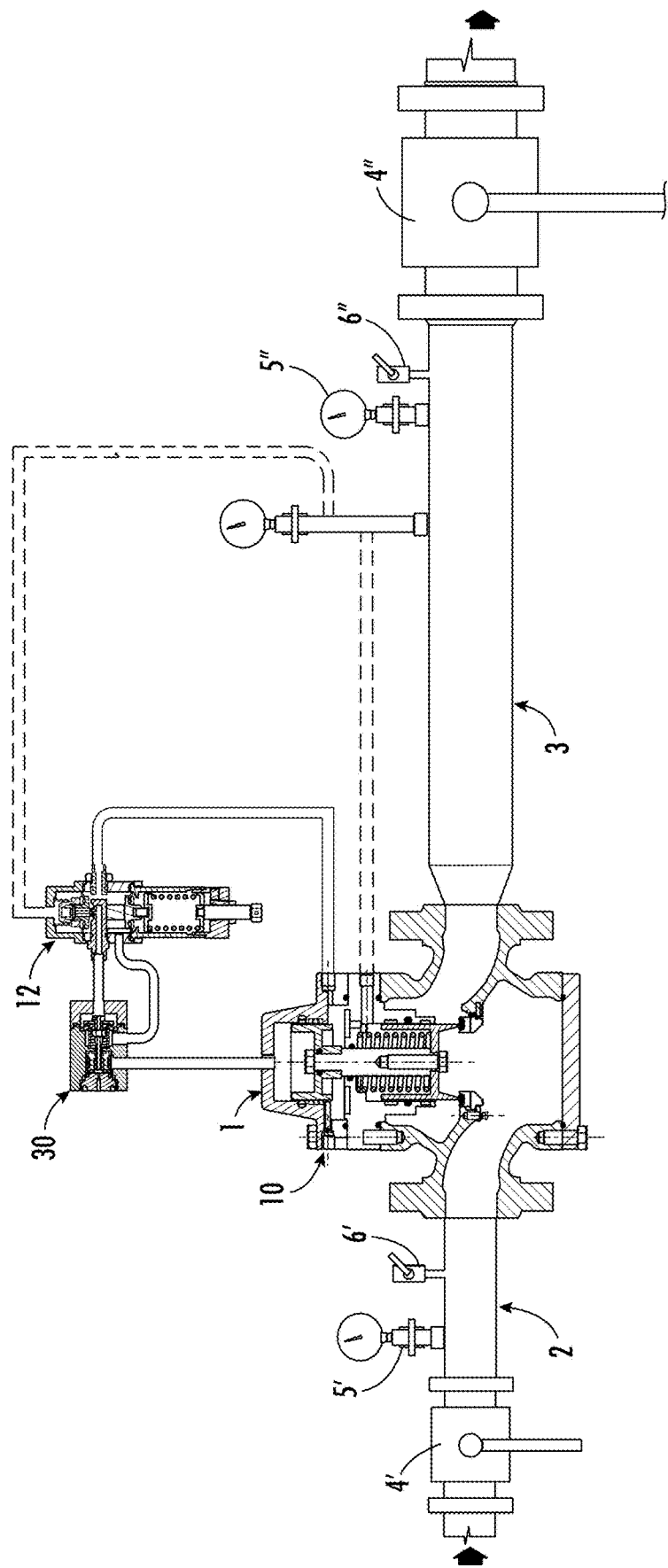
FIG. 1 shows a diagram of a portion of a gas network in which a regulation apparatus is installed of the pressure according to the invention.

The present invention relates to an apparatus 1 for regulating the gas pressure, and in particular of the type suitable for being installed in a gas transport and/or distribution network. In particular, the apparatus 1 is of the type suitable for causing a reduction in the pressure of the gas that passes through it, and in particular for causing a reduction in the pressure of the gas from a higher value Pin, provided upstream and at the inlet of the apparatus 1, at a lower pressure value Pout, provided downstream and at the outlet of apparatus 1. Conveniently, the lower pressure value downstream and at the outlet of apparatus 1 is preset and, preferably, corresponds to a value of calibration of the apparatus, as will be described in more detail below.

In particular, the apparatus 1 is fluidically connected upstream with an inlet duct 2 and downstream with an outlet duct 3, both external to said apparatus 1.

Conveniently, a first valve can be provided in correspondence with the inlet duct 2 interception 4', for example of the on/off type. Preferably, in correspondence with the inlet duct 2, between the apparatus 1 and the first valve 4', a first pressure sensor 5' and, advantageously, also a first release valve 6' are provided.

Conveniently, a second interception valve 4", for example of the on/off type, can be provided in correspondence with the outlet duct 3. Preferably, in correspondence with the outlet duct 3, between the apparatus 1 and the second valve 4", at least a second pressure sensor 5" and, advantageously, also a second release valve 6" are provided.

The apparatus 1 according to the invention comprises a main regulator 10 and a pilot regulator 12.

In particular, the main regulator 10 comprises a body/casing 11—which can be made in a single piece or in several pieces suitably fixed together—which is affected by a plurality of chambers, cavities and passages, which will be recalled in the course of the following description.

The main regulator 10 comprises an inlet area 13, which is and always remains in fluidic connection with the inlet duct 2, and an outlet area 14, which is and always remains in fluidic connection with the outlet duct 3.

Conveniently, both the inlet 13 and outlet 14 areas are defined inside the body/casing 11 of the main regulator 10. Preferably, but not necessarily, the inlet area 13 and the outlet area 14 are vertically superimposed.

In particular, the pressure Pin of the gas at the inlet area 13 corresponds to the pressure of the gas in the inlet duct 2, and therefore to the pressure of the gas upstream of the apparatus 1; the gas pressure Pout at the outlet area 14 corresponds to the gas pressure in the outlet duct 3, and therefore to the gas pressure downstream of the apparatus 1.

Conveniently, the inlet area 13 and the outlet area 14 they communicate with each other through an opening 16 in correspondence with which a shutter 15 acts. In particular, the main regulator 10 (and in particular the shutter 15) is configured in such a way that, preferably at the connection opening 16 between the two areas 13 and 14 define a constriction (i.e. a reduction of the section with respect to the opening 16), to thereby cause a fall of gas pressure from a pressure Pin the present in the entrance area 13 at a pressure Pout present in the outlet area 14.

More in detail, the shutter 15 of the main regulator 10 is movable between:

a closing position of said restriction, to interrupt/block the passage of the gas from the inlet area 13 to the outlet area 14, and therefore the passage of the gas towards the outlet of the apparatus 1, and at least one opening position of said restriction, to thus allow the passage of gas, and a corresponding drop in gas pressure, from the inlet area 13 to the outlet area 14 through said restriction.

Conveniently, the shutter 15 is movable between a plurality of opening positions to increase or decrease the passage section of the aforementioned restriction, and thus vary the pressure drop from Pin to Pout.

The main regulator 10 comprises means, which preferably comprise an elastic element 17, which are configured to push said shutter 15 towards said closed position.

Conveniently, said elastic element 17 is housed inside the body/casing 11, and acts directly or indirectly on the shutter 15 so as to push it towards and/or keep it in the closed position. Preferably, the elastic element 17 comprises a helical spring.

Advantageously, in a possible embodiment (see FIG. 2-9), the elastic element 17 acts directly on the shutter 15 and, in particular, can act between the body/casing 11 and a first face of the shutter 15, ie on the face of the shutter which is opposite to that facing the inlet area 13 and on which the gas at pressure Pin acts.

Conveniently, in a possible embodiment (see FIG. 2-7), a gasket 18 cooperating with the shutter 15 can be provided at the edge surrounding the opening 16. Conveniently, in a possible embodiment (see FIGS. 8 and 9), a gasket 18 can be mounted on the shutter 15 cooperating with the edge surrounding the opening 16. In particular, when the shutter 15 is in the closed position, the elastic element 17 pushes the shutter 15 against the edge surrounding the opening 16 so as to compress the gasket 18, thus ensuring the seal of the gas passage between the inlet area 13 and the outlet area 14.

Advantageously, the shutter 15 is housed, at least in part, in the outlet area 14 and is movable inside the latter. Conveniently, in a possible embodiment (see FIG. 2-7), the body/casing 11 comprises inside a cavity 19 in which the elastic element 17 is housed and in which at least a part of the shutter 15. In another possible embodiment (see FIGS. 8 and 9), the shutter 15 and the elastic element 17 are instead entirely housed and movable within the same chamber defining the outlet area 14.

Figures 2, 2A:
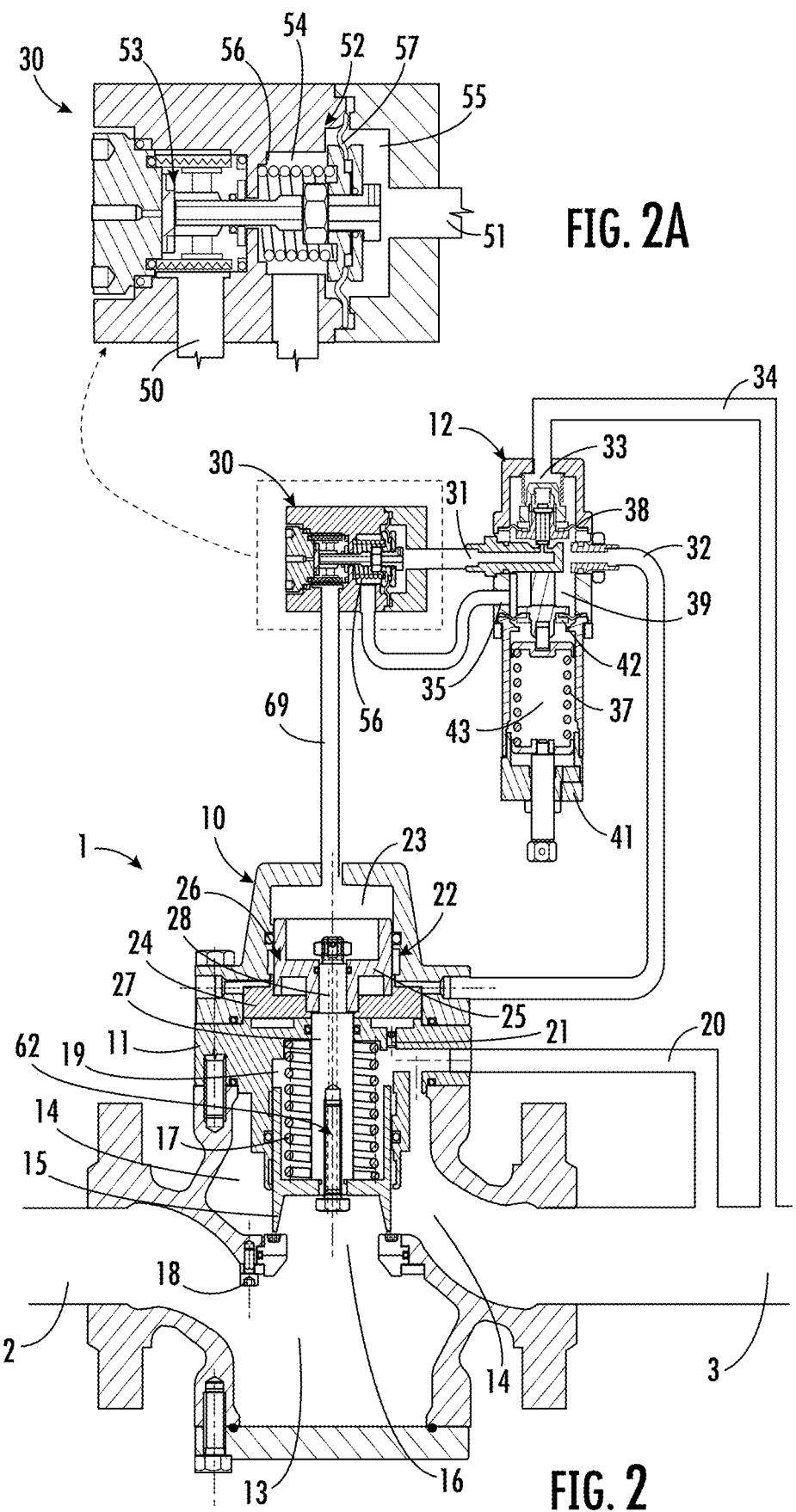
FIG. 2 shows in schematic view a first embodiment of the regulation apparatus according to the invention in an FTC configuration.
FIG. 2a shows an enlarged detail of FIG. 2 relating to said further regulator acting as a pressure reducer.
Figure 3:
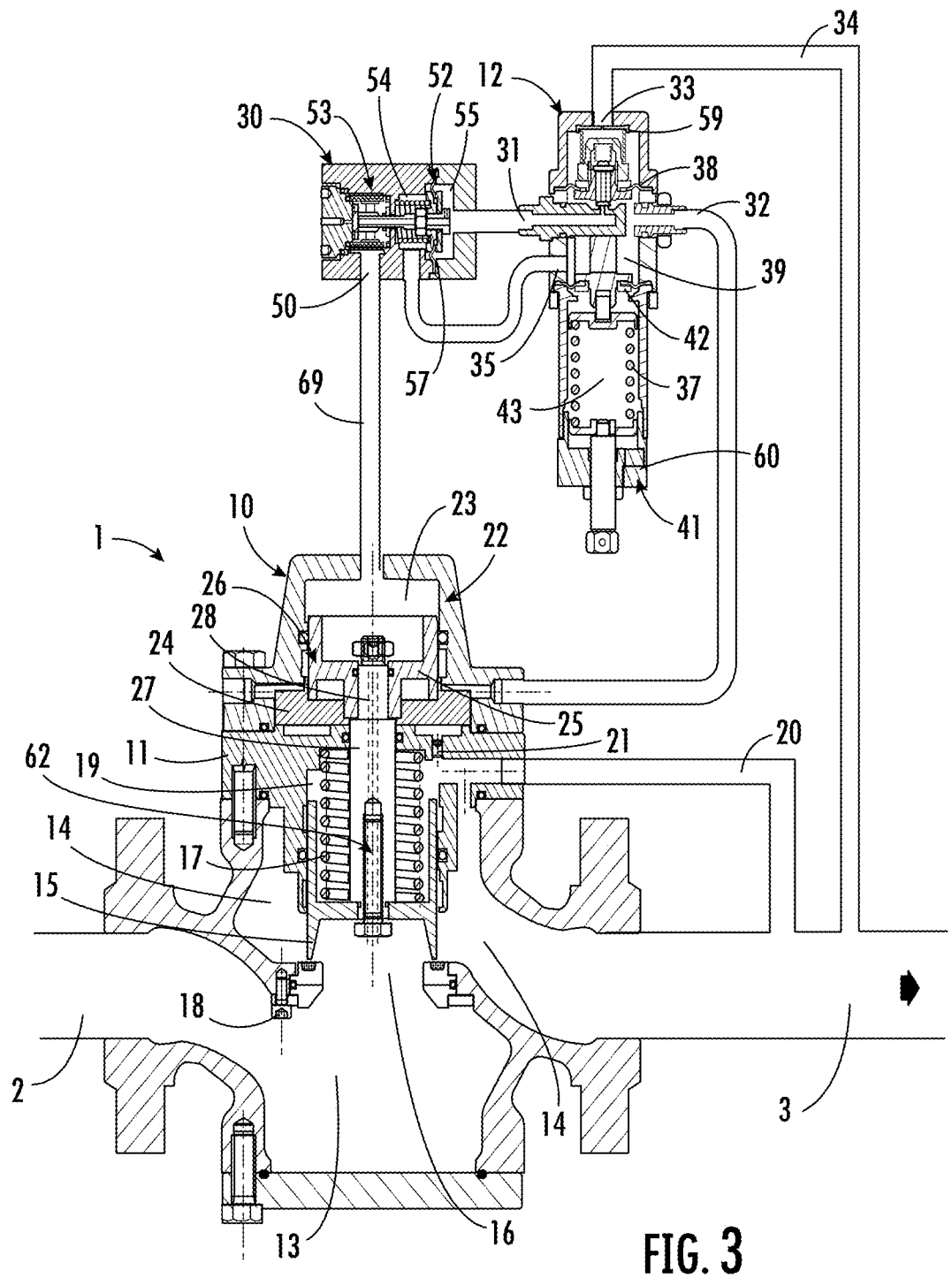
FIG. 3 shows a schematic view of the regulation apparatus of FIG. 2 in an FTO configuration, FIG. 4 schematically shows an advantageous embodiment, with simplified connections, of the regulating apparatus according to the invention in an FTC configuration.
Figure 4:
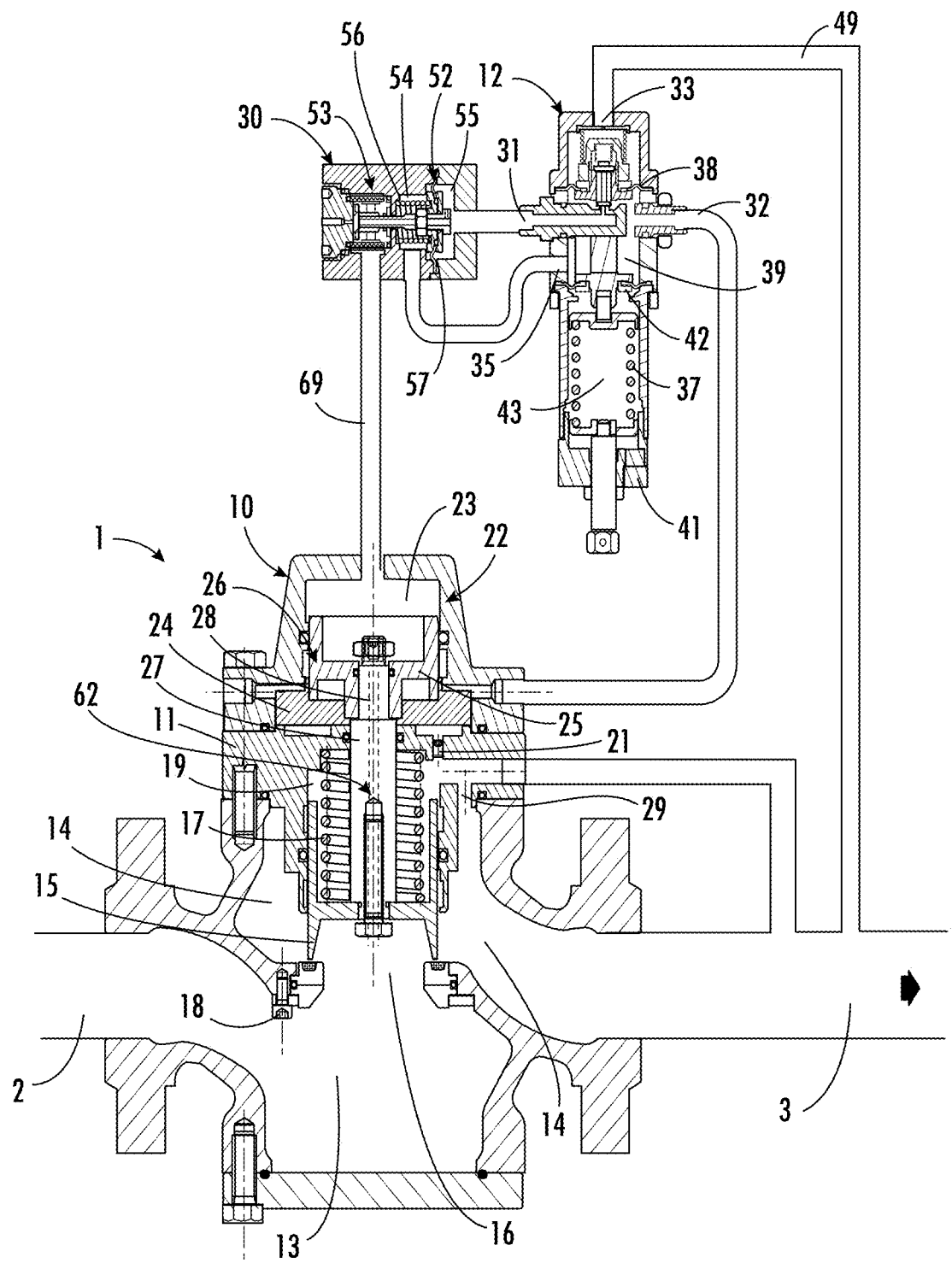
Figure 5:
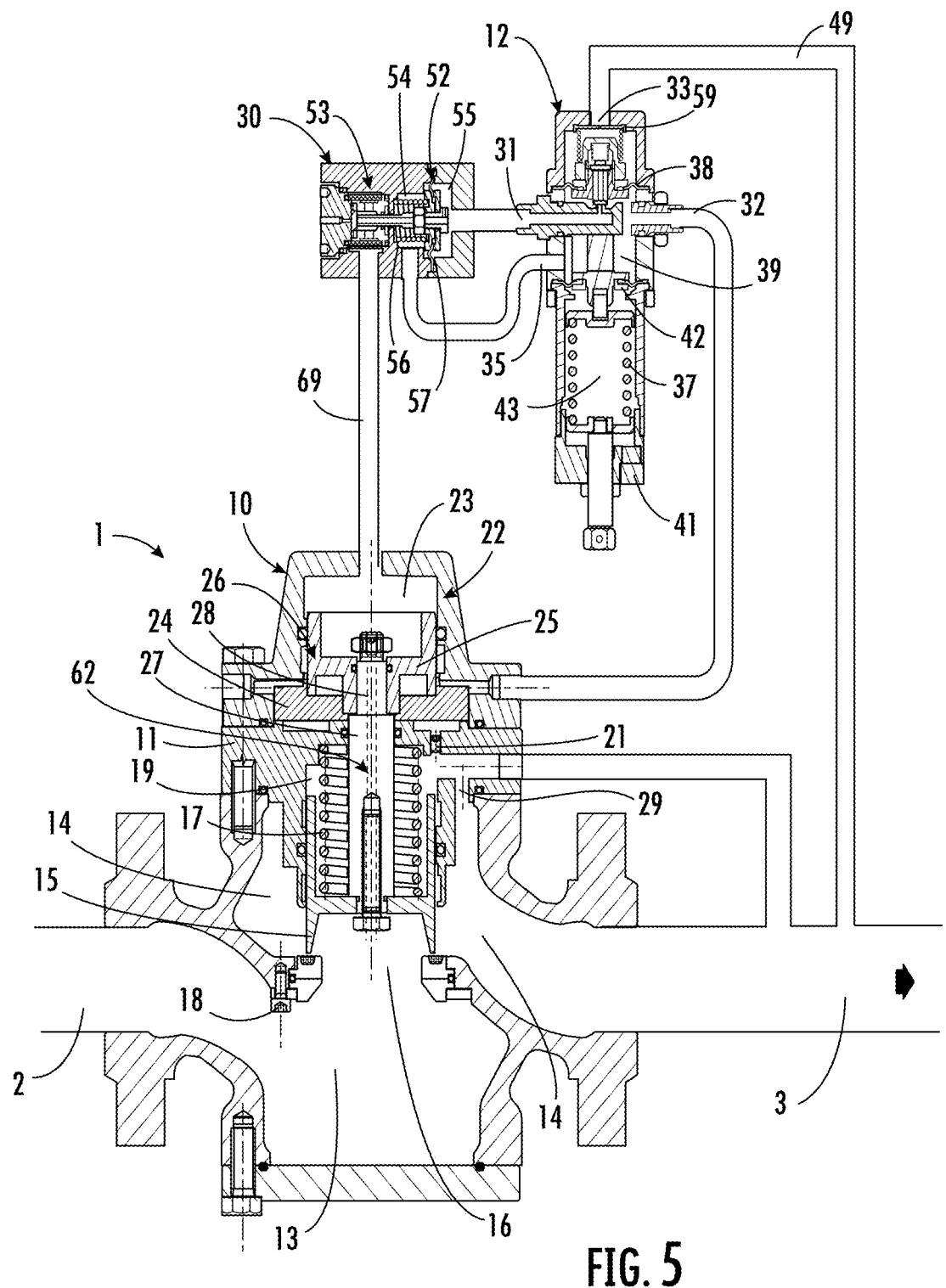
FIG. 5 shows a schematic view of the regulating apparatus of FIG. 4 in an FTO configuration, FIG. 6 schematically shows a basic (minimal) embodiment of the regulation apparatus according to the invention in an FTC configuration.
Figure 6:
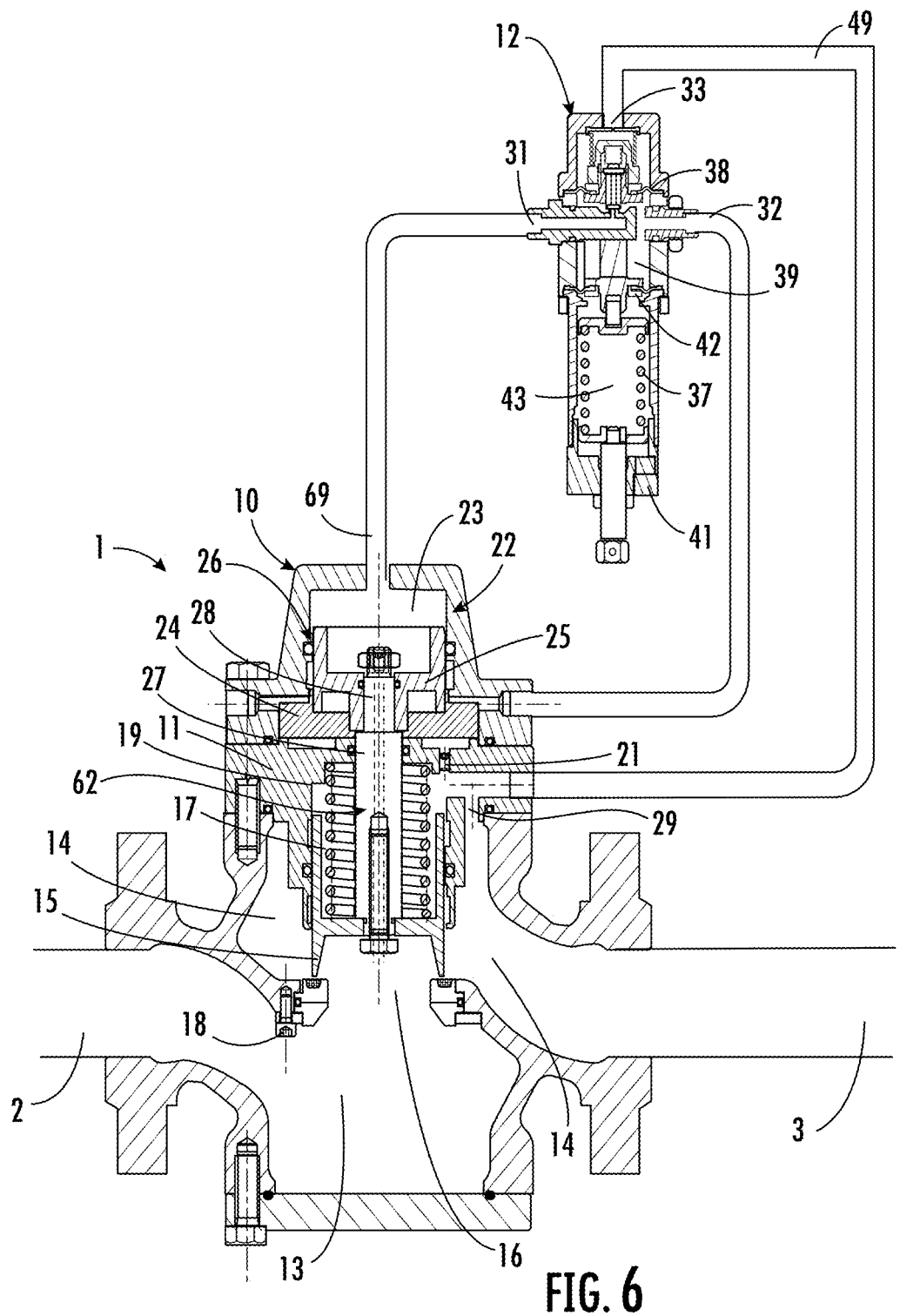
Figure 7:
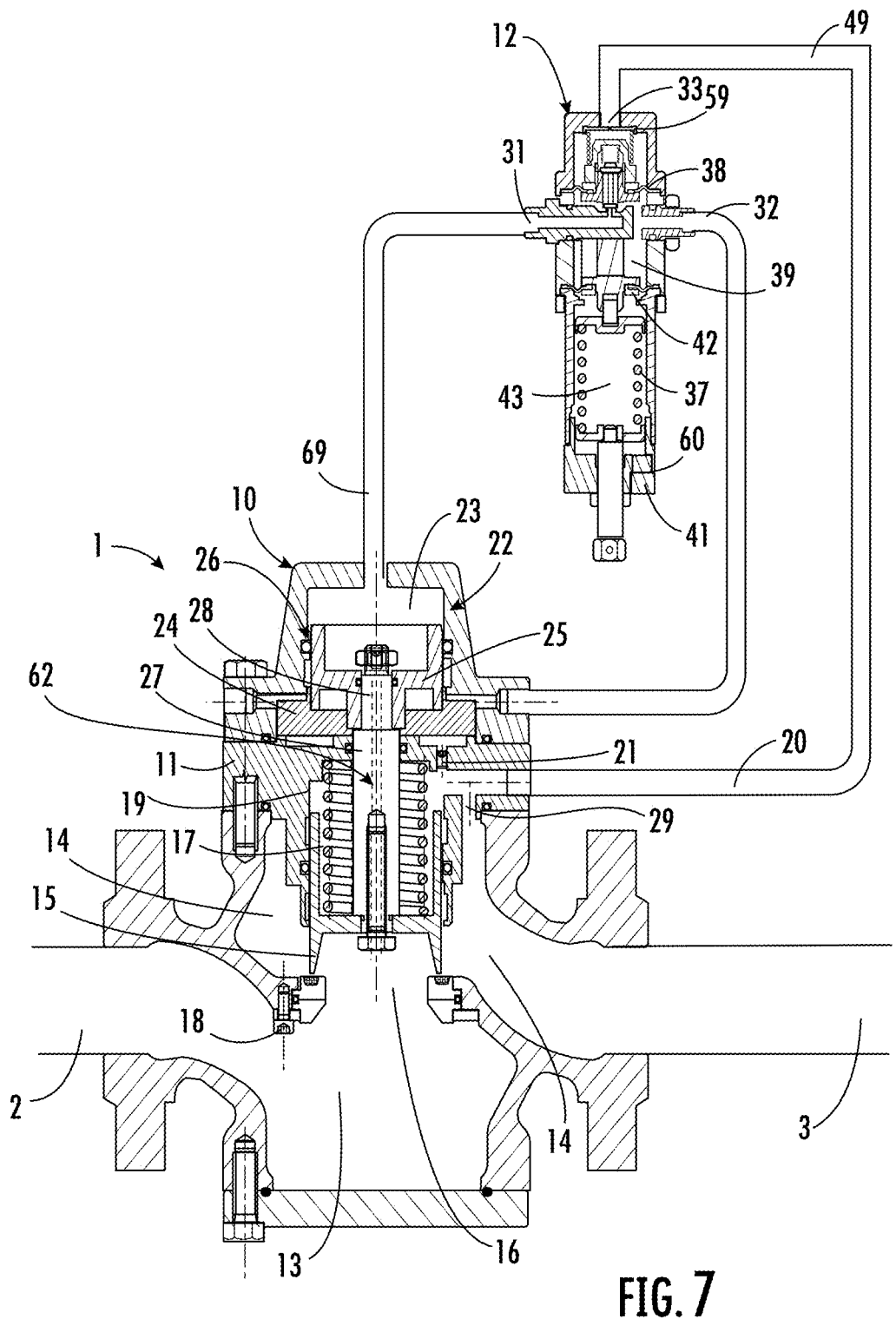
FIG. 7 shows a schematic view of the regulation apparatus of FIG. 6 in an FTO configuration, FIG. 8 schematically shows a variant embodiment of the adjustment apparatus of FIG. 2, and FIG. 9 schematically shows a variant embodiment of the adjustment apparatus of FIG. 6.
Figure 8:
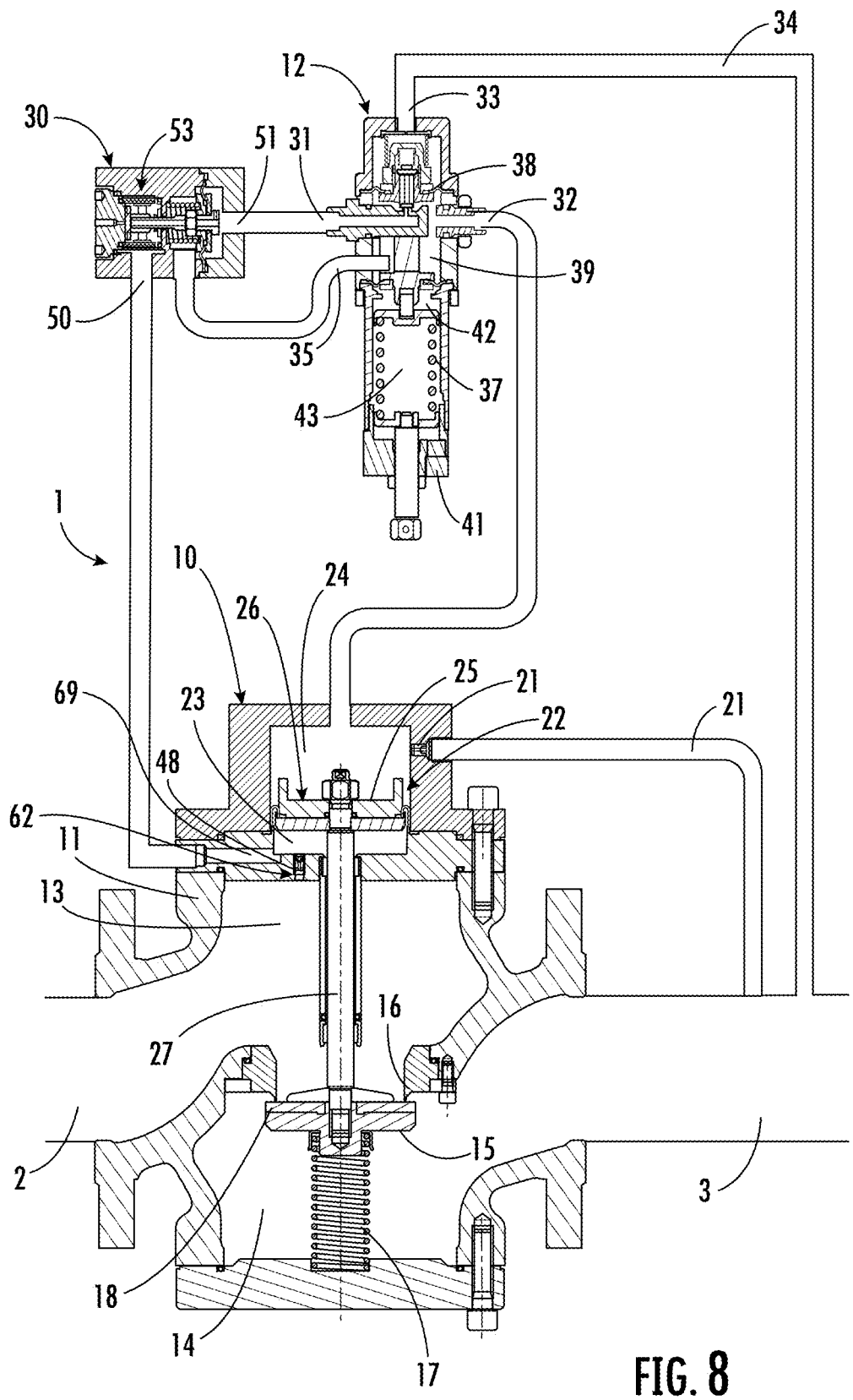
Figure 9:
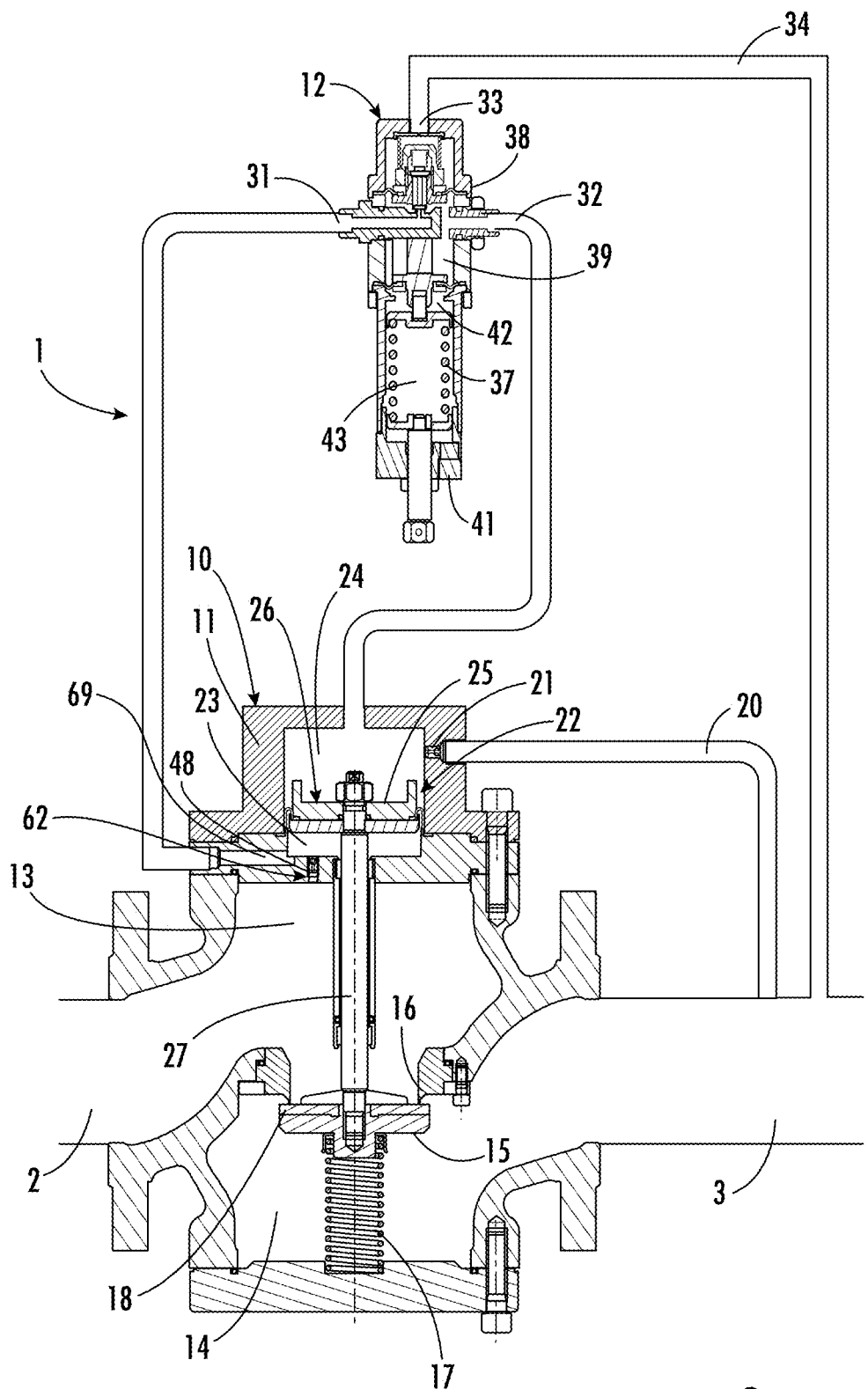

Conveniently, in the embodiments of FIGS. 2 and 3, the shutter 15 separates—and in particular always keeps fluidly separated from each other—the outlet area 14 from the cavity 19 in which the elastic element 17 is housed. More in detail, in this case, the cavity 19 is fluidically connected with the outlet duct 3 preferably by means of a dedicated channel 20 which is external to the body/casing 11 and, therefore, the cavity 19 and the outlet area 14 can be fluidically connected with the outlet duct 3 in an independent and separate way.

Conveniently, in the embodiments of FIGS. 4-7, the shutter 15 fluidically separates from each other, in correspondence with the passage defined by the opening 16, the exit area 14 from the cavity 19 in which the elastic element 17 is housed, however there is a passage hole 29, which can be obtained inside the body/casing 11 and which always keeps the cavity 19 connected to the outlet area 14, preferably independently of the position of the shutter 15.

Advantageously, in a possible embodiment (see ad. for example FIGS. 2-7), the inlet area 13 is positioned below the outlet area 14 of the main regulator 10. Advantageously, in another possible embodiment (see, for example, FIGS. 8 and 9), the inlet area 13 is positioned above the outlet area 14 of the main regulator 10.

Conveniently, as mentioned, on the face of the shutter 15 facing the inlet area 13 gas acts at pressure Pin, i.e. a pressure value which substantially corresponds to that of the inlet duct 2 and to that upstream and at the inlet of the apparatus 1.

The main regulator 10 also comprises a motorization chamber 22 which, preferably, is also defined internally of the same body/casing 11. Advantageously, the motorization chamber 22 is positioned above the inlet area 13 and/or the outlet area 14.

The motorization chamber 22 houses inside it a movable element, and for example a movable wall 25, which divides the chamber itself into two sub-chambers, and in particular a first sub-chamber 23 and a second sub-chamber 24.

Preferably, the movable wall 25 is part of a piston element 26 and has a first face facing the first sub-chamber 23 and a second face facing the second sub-chamber 24.

The two sub-chambers 23, 24 of the motorization chamber 22 are and always remain fluidly separated from each other by means of said movable wall 25. In particular, the movable wall 25 is movable inside the motorization chamber 22 to thus cause an increase in the volume of one of the two sub-chambers 23 or 24, and a simultaneous decrease in the volume of the other sub-chamber 24 or 23.

More in detail, the first sub-chamber 23 is in fluidic communication at the inlet with the inlet area 13 and/or with the inlet duct 2, while at the outlet it is in fluidic communication with the inlet 31 of the pilot regulator 12. Conveniently, said first sub-chamber 23 is in fluid communication with the inlet area 13 and/or with said inlet duct 2 directly, i.e. without passing or crossing the pilot regulator 12.

Figure 10:
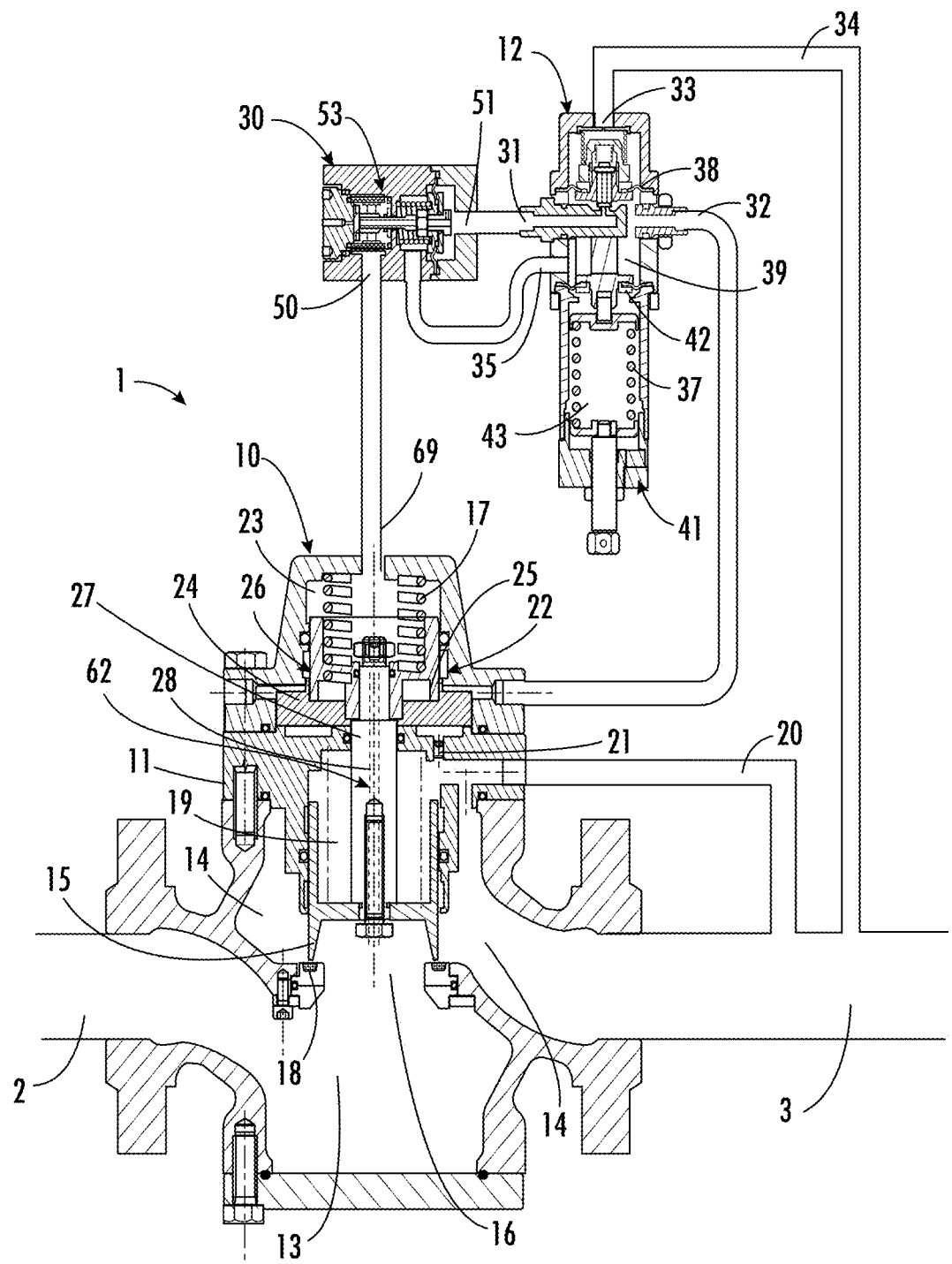
FIG. 10 shows a schematic view of a further variant embodiment of the adjustment apparatus of FIG. 2.

Advantageously, in another possible embodiment (cf. FIG. 10), the elastic element 17 can act on the shutter 15 indirectly (ie without being in direct contact). In particular, the elastic element 17 could act on the movable wall 25, and in particular on the piston element 26, and preferably, in this case, the elastic element 17 is housed in the first sub-chamber 23 of the motorization chamber 22. Conveniently therefore, the elastic element 17 acts on the movable wall 25, which, being integral in translation with the shutter, causes the latter to move towards the closed position.

More in detail, the second sub-chamber 24 is in fluidic communication at the inlet with the outlet 32 of the pilot regulator 12 while at the outlet it is in fluidic communication with the outlet area 14 and/or with the outlet duct 3. Conveniently, said second sub-chamber 24 the outlet area 14 and/or with the outlet duct 3 is in fluid communication directly, i.e. without passing or crossing the pilot regulator 12.

Advantageously, in a possible embodiment (see for example the figures FIG. 2-7), the first sub-chamber 23 is positioned above the second sub-chamber 24; in another possible embodiment (see for example FIGS. 8 and 9), the first sub-chamber 23 is positioned below the second sub-chamber 24.

Advantageously, inside the body/casing 11 of the main regulator 10, the motorization chamber 22 is vertically superimposed and/or aligned with respect to the chamber defining the inlet area 13 and with respect to the chamber defining the outlet area 14.

Conveniently, the first sub-chamber 23 of the motorization chamber 22 is in communication with the inlet area 13 and/or with the inlet duct 2 by means of a first fluidic connection section 62 which, advantageously, can be obtained inside the body/casing 11 and/or outside by means of a dedicated by-pass circuit. In particular, advantageously, in a possible embodiment (see FIG. 2-7), the rod 27 comprises inside it a passage duct 28 which defines said first fluidic connection section 62 and which passes through the rod itself to put the inlet area 13 in fluid communication with the first sub-chamber 23 of the motorization chamber 22. Conveniently, in a possible embodiment (see FIGS. 8 and 9), the inlet area 13 and/or the duct 2 can be connected to the first sub-chamber 23 of the motorization chamber 22 by means of a dedicated by-pass circuit/passage 48, which defines said first fluidic connection section 62, preferably external to the rod 27. Conveniently, said circuit/passage of dedicated by-pass 48 can be obtained in the body/casing 11 of the main regulator 10 and/or it can be obtained outside said body/casing by means of a dedicated channel.

Conveniently, the second sub-chamber 24 is in communication with the outlet area 14 and/or with the outlet duct 3 by means of a second fluidic connection section which, advantageously, can be obtained inside the body/casing 11 and/or—at least partially—outside the latter by means of a dedicated channel 20. Preferably, said second fluidic connection section comprises at least one nozzle 21 to limit the flow out of the second sub-chamber 24, also causing a gas pressure drop. In particular, in a possible embodiment (see FIGS. 2, 3, 8, 9 and 10), the second sub-chamber 24 is in communication with the outlet duct 3 by means of a second connection section which comprises a hole, preferably a nozzle, with nozzle 21 (which is obtained in the body/casing 11 and which connects the second sub-chamber 24 to the cavity 19) and the channel 20 (which is external to the body/casing 11 and which connects the cavity 19 to the outlet duct 3). Conveniently, in another possible embodiment (see FIGS. 4 and 5), the second sub-chamber 24 is in communication with the outlet duct 3 by means of a second connection section which comprises a hole, preferably a nozzle 21, of passage (which is obtained in the body/casing 11 and which connects the second sub-chamber 24 to the cavity 19) and by means of a passage hole 29 (which is also obtained in the body/casing 11 and which connects the cavity 19 to the outlet duct 3).

Conveniently, the second connecting section for discharging the gas of the second sub-chamber 24 towards the outlet area 14 and/or the outlet duct 3 is configured to have at least a portion of the passage channel 20 and/or to have a nozzle 21 with a lower passage section than that of the duct which connects the outlet 32 of the pilot regulator 12 with said second sub-chamber 24.

Advantageously, the second connection section for the gas discharge of the second sub-chamber 24 is configured in such a way as to have leaks higher than those of the first connection section 62 for the gas supply/drawing into the first sub-chamber 23 of the motorization chamber 22, thus causing a slower discharge of the gas from the second sub-chamber 24 compared to the gas supply within the first sub-chamber 23. Preferably, for this purpose, the second connecting section comprises, at least in part, a duct and/or a nozzle 21 having a passage section lower pressure— preferably much lower—with respect to the duct, and/or to a possible nozzle, of said first connection section 62.

Conveniently, on the face of the movable wall 25 facing the first sub-chamber 23 acts a gas at a pressure Pin which substantially corresponds to that of the inlet area 13 and/or of the inlet duct 2. In particular, in static conditions (i.e. with the pilot regulator 12 closed, and therefore in the absence of a flow rate request by said pilot regulator), the pressure in the first sub-chamber 23 it is the same as that of the inlet area 13 and/or of the inlet duct 2; in dynamic conditions, the pressure in the first sub-chamber 23 is slightly lower than that of the inlet area 13 and/or of the inlet duct 2 because in any case the maximum flow rate that can be tapped from the sub-chamber 23 by the pilot regulator 12 is limited by the discharge of the circuit downstream of the pilot regulator 12, in which in particular the second connection section has—at least in part—a portion and/or comprises a nozzle 21 with a much smaller passage section than that of said first connection section 62 of said sub-chamber 23 with the inlet area 13 and/or with the inlet duct 2.

Conveniently, the movable wall 25 acting inside the motorization chamber 22 is associated with the shutter 15 so that said wall and said shutter are mutually integral in translation (i.e. the translation of one also causes the translation of the other). Preferably, the movable wall 25 and the shutter 15 are integral with each other in translation by at least one intermediate element interposed between the movable wall 25 and the shutter 15. Conveniently, in some possible embodiments, the movable wall 25 and the shutter 15 and said intermediate element (in particular the rod 27) can be made in a single piece, or the movable wall 25 or the shutter 15 can be made in a single piece with the intermediate element (in particular the rod 27). Conveniently, in some possible embodiments, said at least one intermediate element (in particular the rod 27) can be mechanically fixed to the mobile wall 25 and/or to the shutter 15, or it can also be supported (i.e. without being mechanically fixed) on said movable wall 25 and/or on the shutter 15, and in the latter case said at least one intermediate element (in particular the rod 27) is kept in contact/support on the movable wall 25 and/or on the shutter 15 by the opposing forces which are respectively generated by the pressure of the gas in the inlet area 13 and acting on the shutter 15, and the pressure in the first sub-chamber 23 which acts on the movable wall 25.

Advantageously, said intermediate element can be defined by a rod 27 which is fixed, or is in a single piece, or is in contact with the shutter 15 at one end, while the other end is fixed, or is in a single piece, or is in contact with the movable wall 25, and in particular with the piston element 26. Preferably, the rod 27 can be mechanically fixed to the shutter 15 to thus facilitate the preloading of the elastic element 17 and its assembly in safety conditions.

Advantageously, the elastic element 17 of the main regulator 10, suitably shaped as a helical spring, can be traversed longitudinally by said rod 27.

Advantageously, in a possible embodiment not shown here, the seal at the opening 16, which is given by the action of the shutter 15, it can be increased by using a movable wall 25 of the motorization chamber 22 with a thrust area slightly greater than that of the shutter 15. Preferably, for this purpose, the surface development of the first face of the movable wall 25 facing the first sub-chamber 23 is larger than the face of the shutter 15 facing the inlet area 13. Conveniently, the unbalance between the thrust areas of the shutter 15 and the movable wall 25 of the main regulator 10 generates a thrust towards the closing position of said shutter which is added to that of the elastic element 17.

The first sub-chamber 23 of the motorization chamber 22 of the main regulator 10 is in fluidic connection with the inlet 31 of the pilot regulator 12, to thus allow the passage of the gas from said first sub-chamber 23 to said inlet 31 of the regulator of the pilot 12. Conveniently, therefore, the pilot regulator 12 is fed at the inlet with the gas coming from said first sub-chamber 23 of the motorization chamber 22 of the main regulator 10.

In particular, unlike U.S. Pat. No. 6,371,156, the first sub-chamber 23 of the motorization chamber 22 of the main regulator 10 does not receive the gas which has passed through and exits from the pilot regulator 12.

Furthermore, unlike traditional solutions (cf. for example U.S. Pat. Nos. 6,371,156, 2,309,848 and EP2757432), the inlet of the pilot regulator 12 is connected with the inlet area 13 and/or with the inlet duct 2 passing through the first sub-chamber 23 of the motorization chamber 22 of the main regulator 10.

Advantageously, in a possible embodiment (see FIG. 2-5), the first sub-chamber 23 of the drive chamber 22 of the main regulator 10 is in fluidic connection with the inlet 31 of the pilot regulator 12 by means of a further regulator 30 which operates as pre-regulator, and in particular as a reducer of the inlet pressure to the pilot regulator 12.

The pilot regulator 12 comprises an inlet 31 which is fluidically connected—directly or preferably by means of said further regulator 30—with the first sub-chamber 23 of the motorization chamber 22 of the main regulator 10; therefore, the pilot regulator 12 receives at its inlet, directly or by means of a further regulator 30, the gas coming from said first sub-chamber 23.

The pilot regulator 12 comprises an outlet 32, which is fluidically connected to the second sub-chamber 24 of the motorization chamber 22 of the main regulator 10. Conveniently, therefore, the second sub-chamber 24 of the motorization chamber 22 of the main regulator 10 receives the gas that has passed through and exits from the pilot regulator 12.

The pilot regulator 12 comprises at least one pilot valve, which regulates the passage of gas from inlet 31 to outlet 32. In particular, the pilot valve is configured in such a way that its closing and its degree of opening depend on the calibration pressure and on the pressure of the gas Pout leaving the apparatus 1 (i.e. at the pressure in correspondence with the outlet area 14 and/or the outlet duct 3). More in detail, suitably, the closure and degree of opening of the pilot valve is controlled on the basis of the difference between the thrust (preferably presettable) exerted by an elastic member 37 and/or by a calibration chamber under pressure and the thrust generated from the pressure of the gas Pout at the outlet from the apparatus 1 (i.e. at the pressure in correspondence with the outlet area 14 and/or the outlet duct 3) on a cursor 38 of said valve.

Advantageously, in a possible embodiment (see FIG. 2-5), the pilot regulator 12 also comprises a further outlet 35, which is in fluidic connection with said further regulator 30.

The pilot regulator 12 also comprises a control input 33 for gas at pressure Pout, i.e. gas at a pressure corresponding to that of the outlet area 14 and/or of the outlet duct 3, ie the pressure of the gas downstream of the apparatus 1. Suitably, the gas that enters passes through the control input 33 acts on the cursor 38 of the pilot valve of the pilot regulator 12. In particular, the cursor 38 acts in correspondence with the lumen of passage of the gas from the inlet 31 towards an outlet cavity 39 which is always in fluidic connection with the outlet 32 and, if provided, also with the further outlet 35.

In particular, in a possible embodiment, the control input 33 of the pilot regulator 12 is fluidically connected/directly connectable with the outlet duct 3 by means of a dedicated branch 34 (cf. FIGS. 2 and 3).

Advantageously, in a possible embodiment (see FIGS. 4-7), the control input 33 of the pilot regulator 12 is fluidly connected with the outlet area 14 and/or with the cavity 19 of the main regulator 10 by means of a branch 49. This embodiment is particularly advantageous in that it avoids intervening with connections to be defined directly on the outlet duct 3, which is external to the apparatus 1. In particular, by connecting the control input 33 of the pilot regulator 12 with the outlet area 14 and/or with the cavity 19, it is possible to avoid defining direct connections on the outlet duct 3 of the apparatus 1, with obvious advantages in terms of cost and ease of installation of the apparatus itself.

Advantageously, the configuration of the body/casing of the pilot regulator 12 can be substantially of the traditional type, with the exception of the fact that in a possible embodiment (see FIGS. 2-5 and 8) it can also comprise a further outlet 35 in connection with said further regulator 30.

Conveniently, the cursor 38 of the pilot valve of the pilot regulator 12 defines/delimits the passage section for the gas that passes from the inlet 31 to the internal chamber 39. In particular, the cursor 38 thus defines the drop gas pressure from inlet 31 to outlet 32 or to said further outlet 35.

Conveniently, the cursor 38 of the pilot valve of the pilot regulator 12 is movable between:
  a completely closed position, in which the gas from the inlet 31 does not pass through the lumen, and therefore does not reach the outlet cavity 39 connected to the outlet 32 and—if provided—to the further outlet 35, and
  a plurality of (at least two) opening positions, in which the gas can pass from the inlet 31 through the lumen towards the outlet cavity 39, reducing its pressure according to the width of the lumen defined by the cursor 38.

Advantageously, the pilot regulator 12 comprises an elastic member 37 and/or a pressure calibration chamber which act on said cursor 38 of said regulator in contrast to the gas pressure coming from the control input 33. More in detail, the gas pressure coming from the control input 33—and corresponding to the pressure Pout—compensates for the action of the elastic member 37 and/or of the pressure calibration chamber of the pilot regulator, which tends to bring the cursor 38 into the open condition.

Advantageously, the pilot regulator 12 is configured in such a way that the working position of said elastic member 37 can be varied—preferably from the outside of the pilot regulator—and therefore the thrust that the latter exerts on the cursor 38. Conveniently, by acting on the elastic member 37—to be preset during the calibration phase—the set-point value (i.e. to reach/maintain) of the pressure Pout of the gas leaving the apparatus 1 is defined. In other words, the elastic member 37 of the pilot regulator is suitably calibrated so as to counterbalance a predefined pressure of the gas downstream/outgoing from the apparatus 1.

Conveniently, the movement of the cursor 38 is controlled/commanded by the combined action, and acting on said cursor 38 in opposite directions, of the gas pressure coming from the control input 33 and of the action of said elastic member 37 and/or of a pressure calibration chamber.

Conveniently, when the thrust on the cursor 38, which is given by the gas pressure coming from the control input 33, exceeds the thrust of the elastic member 37 and/or of the pressure calibration chamber, said cursor 38 is in a closure and, therefore, there is no passage of gas from inlet 31 to outlet cavity 39 connected to outlet 32 and—if provided—to further outlet 35.

Advantageously, the pilot regulator 12 also comprises a further movable element 42 and, on the opposite surfaces of said further movable element 42, the thrust given by the pressure of the gas that has passed through the lumen (and which therefore has a lower pressure than that of the inlet 31 gas) and the thrust act in opposite directions. the pressure of the external environment of installation of the apparatus (preferably corresponding to the air of the atmospheric pressure). Conveniently, the air from the external environment enters the pilot regulator 12 through a hole 41. Preferably, said further movable element 42 separates the outlet cavity 39, into which the gas that has passed through the lumen enters, and a cavity 43 which is connected to the hole 41 for the air inlet of the external environment and in which said elastic member 37 is preferably housed.

Advantageously, as mentioned, in some possible embodiments of the apparatus 1 (see FIG. 2-5, 8-10), the latter also comprises a further regulator 30 acting as a pre-reducer, and in particular as a reducer of the inlet pressure to the pilot regulator 12. Conveniently, said further regulator 30 is configured to stabilize the operation of the pilot regulator 12 and make it operate in constant conditions, in particular at constant pressure ranges Δp, with respect to the gas pressure at the outlet of the pilot regulator 12, which preferably corresponds to the pressure and in the outlet cavity 39 and at the pressure at the outlet 32 and/or at the further outlet 35.

In particular, said further regulator 30 comprises a valve configured to define/set the pressure at the outlet 51 of said further regulator 30 based on:
a predefined pressure, which is preferably defined by the thrust of elastic means 56 provided in said further regulator 30,
of the gas pressure leaving the pilot regulator 12.

Conveniently, the first sub-chamber 23 of the motorization chamber 22 is in fluidic connection with the inlet 50 of said further regulator 30, which is then connected at the outlet 51 with the inlet 31 of the pilot regulator 12. Furthermore, the outlet 35 of the pilot regulator 12 is conveniently connected fluidly with an internal chamber 52 of said further regulator 30.

Advantageously, said further regulator 30 comprises a section 53, connected to the inlet 50, configured for causing a first reduction in the pressure of the gas which enters the regulator itself from the inlet 50, drawing from the first sub-chamber 23 of the motorization chamber 22. In particular, the section 53 is defined inside said further regulator 30 so as to be interposed between the gas inlet 50 and the outlet 51 inside the regulator itself.

Conveniently, a movable member 57 is housed in said internal chamber 52, which divides said internal chamber into a first zone 54 and into a second zone 55. In particular, the two zones 54 and 55 of the internal chamber 52 always remain fluidly separated from each other. The first zone 54 is in fluidic connection with said further outlet 35 of the pilot regulator 12. Furthermore, advantageously, inside the first zone 54 there are housed said elastic means 56 (for example defined by a helical spring) acting on one face of said movable member 57 in addition to the thrust action given by the pressure of the gas which enters the first zone 54 coming from the further outlet 35 of the pilot regulator 12.

The second zone 55 of the internal chamber 52 of said further regulator 30 is fluidically connected with the pressure reduction section 53 and with the outlet 51 of said further regulator 30, and therefore with the inlet 31 of the pilot regulator 12.

Therefore, advantageously, said further regulator 30 is configured so that the gas pressure at the its outlet 51 (and therefore at the input of the pilot regulator 12) depends on and/or is substantially defined by the thrust that the movable member 57 exerts on the gas present inside er of said second zone 55 and, suitably, in turn this thrust depends and/or is substantially defined, on the other face of the movable member 57, by the combined action of the elastic means 56 and the pressure of the gas present in the first zone 54.

In substance, said further regulator 30 is configured so that the pressure at its outlet 51—and therefore at the inlet 31 of the pilot regulator 12—depends on the pressure exiting from the pilot regulator 12, and on the action of the elastic means 56 of said further regulator 30.

Therefore, said further regulator 30 is configured in such a way that the pressure of the gas at the outlet, and therefore at the inlet of the pilot regulator 12, is fed/depends on the pressure of the gas at the outlet of the same pilot regulator 12 In other words, the pressure of the gas coming from said further regulator 30 and entering the pilot regulator 12 is self-increasing. In this way, therefore, the pilot regulator 12 can operate with a substantially constant pressure drop, regardless of the pressure downstream of the apparatus 1.

Conveniently, the shutter 15 of the main regulator 10, the cursor 38 of the pilot regulator 12, called further movable element 42 of the pilot regulator 12 and/or the movable member 57 of the eventual further regulator 30 can be defined by one or more elements of suitable shape (and therefore it is installed and acting in a seat of corresponding shape provided in the respective regulator), and can be made of rigid or elastic material, and in particular can be wholly or partially of the membrane type, possibly with at least one elastically deformable zone. Conveniently, the movable wall 25 of the motorization chamber 22 of the main regulator 10 can also be made of rigid or elastic material, and in particular can be wholly or partially of the membrane type, possibly with at least one elastically deformable zone.

The operation of the apparatus 1 according to the invention is as follows.

When no flow rate downstream of the regulation apparatus 1 is required (for example when no flow rate is required from the user connected downstream of the apparatus), the apparatus itself is in the closed configuration. In particular, in this configuration, the gas entering the apparatus 1 with pressure Pin enters the inlet area 2 and acts on the corresponding exposed face of the shutter 15 of the main regulator 10, in contrast to the action of the elastic element 17, and would thus tend to bring said shutter into an open condition. However, the gas at pressure Pin, at the inlet to the apparatus 1, from the inlet area 2 it also reaches the first sub-chamber 23 of the motorization chamber 22, preferably through the first fluidic connection section 62, which can be defined by the duct 28 obtained in the connecting rod 27 of the shutter 15 to the movable wall 25, or from a dedicated by-pass circuit 48. Therefore, the gas in the first sub-chamber 23 of the motorization chamber 22 acts on the corresponding face of the movable wall 25 and the latter—being integral in translation with the shutter 15—thus acts, in addition to the action of the elastic element 17, so as to return said shutter 15 to the closed condition.

In essence, the thrust exerted directly on the shutter 15 of the main regulator 10 by the gas at pressure Pin, which is located in the inlet area 2 to the apparatus 1, is opposed by the thrust exerted on the mobile wall 25 by the gas, which reaches the first sub-chamber 23, and which is located at a pressure which also depends on the pressure Pin the input apparatus 1. Suitably, when the apparatus 1 is in the closed configuration, the same apparatus operates in static conditions, ie there is no flow of gas through the main regulator 10 and through the pilot regulator 12, and there is no loss of load, whereby the pressure in the first sub-chamber 23 corresponds to the pressure Pin the input apparatus 1.

In particular, in this situation, the shutter 15 of the main regulator 10 remains in the closed condition, and therefore there is no passage of gas from the inlet area 13 towards the outlet area 14, and therefore from the inlet duct 2 a upstream of the apparatus 1 towards the outlet duct 3 downstream of the apparatus itself.

In particular, moreover, in this situation, the thrusts on the cursor 38 of the pilot valve of the pilot regulator 12 are such that the valve itself is in a closed condition, thus preventing the passage of gas from the inlet 31 to the outlet. 32 and, optionally, towards said further outlet 35. More in detail, in this situation, the gas at pressure Pout downstream of the apparatus 1, and corresponding to the gas pressure of the outlet area 14 and/or in the outlet duct 3, enters the pilot regulator 12 through the control input 33 and acts on the cursor 38 compensating/balancing the action of the elastic member 37 and/or of the pressure calibration chamber of the pilot regulator 12.

When, on the other hand, the flow rate increases the gas required downstream of apparatus 1 (for example when the demand for gas by the user connected downstream of the apparatus increases), the pressure Pout of the gas downstream of said apparatus 1 (and in particular in correspondence with the outlet duct 3 and/or outlet area 14) begins to decrease. Conveniently, when the gas pressure Pout falls below the value which counterbalances the action of the elastic member 37 (and/or of the pressure calibration chamber) on the cursor 38 of the pilot regulator 12, the valve opens said cursor 38 (and of the pilot valve), and therefore the passage, and a corresponding pressure reduction, of the gas which coming from the inlet 31 then enters the internal chamber 39 and from there exits the pilot regulator 12 through the outlet 32 and the possible further outlet 35.

Conveniently, the opening of the pilot valve of the pilot regulator 12 causes—with respect to the closing condition, described above, of said pilot regulator 12—an increase in the pressure at its outlet 32 and therefore, also an increase in pressure in the second sub-chamber 24 of the motorization chamber 22.

In particular, the gas that exits, through the outlet 32, from the pilot regulator 12 and reaches the second sub-chamber 24 of the motorization chamber 22, then acts on the movable wall 25 facing towards said second sub-chamber so as to push it to return towards the first sub-chamber 23 of said chamber 22, and—considering that the movable wall 25 is integral in translation with the shutter 15—this brings said shutter 15 into an open condition.

Suitably, when said shutter 15 is in an open condition, the latter defines in correspondence with the opening 16 a corresponding throttling/reduction of the passage section for the gas at a pressure P present in the entrance area 2, thus causing a corresponding decrease of pressure of said gas which thus enters the outlet area 14 with a pressure Pout which is lower than Pin. Then, from the outlet area 14 at pressure Pout it then passes into the outlet duct 3, thus exiting the apparatus 1 towards the valley.

Advantageously, moreover, in the embodiment in which said further regulator 30 is provided, the gas that leaves the pilot regulator 12 through said further outlet 35 reaches the first zone 54 of the internal chamber 53 to act thus—in combination with the elastic means 56—on the movable member 57, to thus increase the pressure of the gas which is inside the second zone 55 and which then enters the pilot regulator 12 through the inlet 31. Therefore, the pressure of the inlet gas is conveniently the pilot regulator 12 is increased by a value that depends on the pressure at the outlet of the same pilot regulator 12, with the advantage of having a gas at the outlet of the latter at a pressure necessary and appropriate to cause (once it has reached the second sub-chamber 24 of the motorization chamber 22) the movement of the movable wall 25 of the main regulator 10, and therefore the opening movement of the shutter 15 of the latter.

At the same time, since the pilot regulator 12—directly or through said further regulator 30—is fed by the gas present in the first sub-chamber 23 of the motorization chamber 22, there is an increase in the gas flow rate required at the inlet of the pilot regulator 12 In particular, the more the flow rate required downstream of the apparatus 1 increases, the more it is necessary to open the shutter 15 of the main regulator 10; in more detail, to modify the opening position of the shutter 15 of the main regulator 10, it is necessary to increase the pressure which, inside the second sub-chamber 24 of the motorization chamber 20, pushes on the movable wall 25 and compensates for the decrease in flow rate output which would occur due to the fact that the volume of said second sub-chamber increases. Conveniently, therefore, there is a temporary increase in the gas flow required at the inlet to the pilot regulator 12 and this causes a decrease in the pressure of the gas present in said first sub-chamber 23.

When the main regulator 10 then finds the new equilibrium (to compensate the increase in the gas demand required downstream of the apparatus 1), the flow rate of the gas exiting the pilot regulator 12, and which therefore reaches the second sub-chamber 24, is reduced to only that necessary to compensate for the discharge through the nozzle 21.

Advantageously, the apparatus 1 is configured so that the supply of the first sub-chamber 23 with the gas of the inlet area 13 and/or with the gas in the inlet duct 2 to the apparatus itself—supply which takes place through the first fluidic connection section 62 which preferably comprises the duct 28 of the rod 27 or the by-pass circuit 48—is slower than the supply of the pilot regulator 12 by means of the gas present in said first sub-chamber 23, thus causing an emptying of said first sub-chamber. More in detail, for this purpose, the section of the first fluidic connection section 62 (which can be defined by the duct 28 which crosses the rod 27 or by the by-pass circuit 48) for feeding said first sub-chamber 23 can have, at least in part, reduced passage section with respect to the duct 69 which connects said sub-chamber 23 to the inlet 31 of the pilot regulator 12, or a nozzle can be provided.

Conveniently, therefore, the increase in the gas pressure in the second sub-chamber 24 of the motorization chamber 22 and the simultaneous decrease in the gas pressure in the first sub-chamber 23 of the motorization chamber 22 cause a high imbalance between the pressures of the gas acting on the respective faces of the piston 26, and the consequent movement of the movable wall 25 so as to increase the volume of the second sub-chamber 24 to the detriment of the first sub-chamber 23 of the same motorization chamber 22, and this also facilitates the opening movement of the shutter 15 which is integral in translation with said movable wall 25.

Advantageously, with the same force required, the high gas pressure unbalance that is created inside the motorization chamber 22 between the two sub-chambers 23 and 24, astride the movable wall 25, it allows to reduce the thrust sections (and in particular the surface development of the mobile wall 25 and of the shutter 15) of the main regulator 10, with the advantage of being able to compact the dimensions (and reduce costs) of the regulator itself with respect to traditional construction.

Advantageously, moreover, in the embodiment with said further regulator 30, since the gas pressure at the inlet to the pilot regulator 12 is self-increasing, the result is that—when the gas pressure required at the outlet of the pilot regulator 12 increases and, therefore, in the second sub-chamber 24 of the motorization chamber 22—the pressure difference between the inlet and the outlet of the pilot regulator 12 always remains constant, thus reducing the need for the cursor 38 of the pilot regulator 12 to change position. This allows a smaller stroke/displacement of the elastic member 37 of the pilot regulator 12, and therefore an increase in accuracy.

On the other hand, when the gas flow rate required downstream of the apparatus 1 decreases (for example when the demand for gas by the user connected downstream of the apparatus decreases), the pressure Pout of the gas downstream of said apparatus 1 (and in particular in correspondence with the outlet duct 3 and/or the outlet area 14) it begins to increase and therefore a series of opposite circumstances occur with respect to those described above in the event of an increase in the flow rate of the gas flow required downstream.

In particular, when the gas pressure Pout rises above the value which counterbalances the action of the elastic member 37 on the cursor 38 of the pilot regulator 12, the action of the gas at pressure Pout—which enters the regulator pilots through the control input 33—overcomes the action of said elastic member 37, and thus causes the closure of said cursor 38, and therefore the interruption of the passage of the gas which, coming from the inlet 31, then enters the internal chamber 39 and from here it exits from the pilot regulator 12 through the outlet 32 and the possible further outlet 35.

Conveniently, the closure of the pilot valve of the pilot regulator 12 causes an interruption of the gas supply to the second sub-chamber 24 of the motorization chamber 22, and this second sub-chamber 24 empties through the drain defined by the second fluidic connection section, thus causing—preferably by means of the nozzle 21—a decrease in the pressure in the second sub-chamber 24 of the motorization chamber 22.

In particular, in this situation, the gas pressure in the second sub-chamber 24 of the motorization chamber 22 and coming from the outlet 32 of the pilot regulator 12 increases, while the pressure of the gas present in the first increases sub-chamber 23 of the same motorization chamber 22. This unbalance between the pressures acting on the respective faces of the movable wall 25 causes a movement of the latter so as to increase the volume of the first sub-chamber 23 to the detriment of the second sub-chamber 24 of the same chamber, causing thus the closing movement of the shutter 15 which is integral in translation with said movable wall 25.

The apparatus 1 according to the invention is particularly advantageous in that the transition from the FTC type (i.e. which leads to complete closure of the shutter 15 of the main regulator 10 in case of malfunction of the cursor 38 of the pilot regulator 12) all the FTO type (i.e. which brings the shutter 15 of the main regulator 10 to full opening in the event of a malfunction of the cursor 38 of the pilot regulator) is extremely quick and simple. In particular—unlike the known solutions, in which the FTC and FTO type apparatuses are constructively different from each other both as regards the main regulator and the pilot regulator—in the apparatus 1 according to the invention, the FTC type and the FTO type require the same constructive and functional configuration, both for the main regulator and for the pilot regulator, as well as the relative connections between them, and it is only required—for the passage from the FTC to the FTO type, the interposition of restrictions section or nozzles at the pilot regulator. In particular, as can be seen from the figures, the configurations FTO of FIGS. 3, 5 and 7 correspond to the corresponding FTC configurations of FIGS. 2, 4 and 6, except for the presence of:
  a first section narrowing or a first nozzle 59 at the control input 33 of the pilot regulator 12,
  a second narrowing of section or a second nozzle 60 in correspondence with the dedicated hole 41 in communication with the external environment (and therefore with the atmospheric pressure).

Conveniently, correspondingly, in the apparatus 1 according to the present invention, in order to pass from the FTO type to the FTC type it is sufficient to remove said section restrictions or nozzles from the pilot regulator.

The present invention also relates to a method for passing an apparatus according to one or more of the preceding claims from a first operating type "Fail To Close" (FTC) to a second operating type "Fail To Open" (FTO), in which one acts on pilot regulator 12 only by applying:
  a first section narrowing or a first nozzle 59 in correspondence with the control input 33 of the pilot regulator 12 from which gas enters at the pressure Pout provided in correspondence with said outlet area 14 and/or said outlet duct 3,
  a second section narrowing or a second nozzle 60 in correspondence with a dedicated hole 41 in communication with the external environment, for the inlet of air at atmospheric pressure.

Appropriately, in a corresponding way, to pass from the second operating type "Fail To Open" (FTO) to the first operating type "Fail To Close" (FTC), act on the pilot regulator only (12) by removing:
  said first section restriction or said first nozzle 58 from the control input 33,
  said second section narrowing or said second nozzle 60 from the dedicated hole 41 for communication with the external environment.

This is extremely advantageous as it allows to standardize the construction of the components between the FTO type and the FTC type, thus obtaining an important reduction in terms of production costs, as well as moving the time of choice between which of the two types to use (choice which is generally carried out by the customer of the system according to the constructive and design logic of the system itself) in a much later phase, potentially also arriving at the time of installation of the apparatus itself.

From what has been said it is clear that the apparatus according to the invention is advantageous in that it allows to reduce the dimensions, in particular of the main regulator, while maintaining a high regulation precision.

In particular, unlike the solutions according to the state of the art, the first sub-chamber of the motorization chamber 22 is fluidically connected with the inlet area 13 of the main regulator 10, and/or connectable with the gas inlet duct 2 to the apparatus 1, and is also connected—directly or through said further regulator 30—with the inlet 31 of the pilot regulator 12. In essence, unlike the solutions according to the state of the art, to pass through the inlet duct 2 and/or the inlet area 13 of the main regulator 10 at the inlet 31 of the pilot regulator, the gas enters and passes through a sub-chamber 23 of the motorization chamber 22 of the main regulator 10. This is particularly advantageous in that it creates, during operational operation of the apparatus 1, a high gas pressure imbalance across the movable wall 25, or other movable element, which separates the two sub-chambers 23 and 24 of the motorization chamber 22, thus allowing to reduce the thrust sections (and in particular the surface development of the mobile wall 25 and of the shutter 15) of the main regulator 10, with the advantage of being able to compact the dimensions (and reduce costs) of the regulator itself compared to traditional construction.

The present invention has been illustrated and described in a preferred embodiment thereof, but it is understood that executive variations may be applied to it in practice, without however departing from the scope of protection of the present patent for industrial invention.

The invention claimed is:

1. Apparatus for regulating gas pressure, of the type suitable for use and installed in systems and/or networks for transport and/or distribution of gas, said apparatus configured to be connected upstream with an inlet duct for the gas in said apparatus and downstream with an outlet duct, the apparatus comprising:
   a main regulator comprising:
      an inlet area fluidically connectable with said inlet duct,
      an outlet area fluidically connectable with said conduit outlet,
      a shutter which acts between said inlet area and said outlet area and which is movable between a closed position, in which the shutter interrupts the passage of gas from said inlet area towards said outlet area, and at least one opening position in which the shutter defines a reduction of a gas passage section from the inlet area to said outlet area, thus causing a corresponding reduction in gas pressure to be said inlet area to said outlet area,
      means, which are configured to push said shutter towards said closed position,
      a motorization chamber in which a movable element is housed, which divides the chamber into a first sub-chamber and a second sub-chamber, said first sub-chamber being fluidly connected with the inlet area and/or connectable with said inlet duct, said second sub-chamber being fluidly connected with the outlet area and/or connectable with said outlet duct to said apparatus, said movable wall and said shutter being integral with each other in translation,
   a pilot regulator comprising:
      an inlet which is fluidically connected with said first sub-chamber, to thus allow the passage of gas from said first sub-chamber towards said inlet of the pilot regulator,
      an outlet which is fluidically connected to said second sub-chamber,
      at least one pilot valve which regulates the passage of gas from the inlet to the outlet of said pilot regulator,
   said pilot regulator is configured such that the closing and the degree of opening of said pilot valve is controlled on the basis of the difference between a calibration pressure, and the gas pressure in correspondence with said outlet area and/or the outlet duct to said apparatus,
   said main regulator is configured so that the gas pressure in said second sub-chamber, and which comes from the pilot regulator, acts on the movable wall of the motorization chamber so as to move said shutter towards said opening condition, while the gas pressure in said first sub-chamber acts on the movable wall of the motorization chamber so as to move said shutter towards said closing condition.

2. The apparatus according to claim 1, wherein said main regulator comprises a gasket which is configured to be compressed when the shutter is in the closed position, thus guaranteeing a sealing of the passage of the gas between the inlet area and the outlet area.

3. The apparatus according to claim 1, wherein said means that are configured to push said shutter towards said closed position comprise an elastic element, and wherein said main regulator comprises a cavity in which said elastic element is housed and which is fluidically separated from said outlet area by means of said shutter.

4. The apparatus according to claim 1, wherein the motorization chamber is aligned with said inlet area and/or said outlet area.

5. The apparatus according to claim 1, wherein the second sub-chamber of the motorization chamber is in communication with the outlet area and/or the outlet duct by means of a second fluidic connection section which is obtained inside the body/casing of the main regulator and/or outside the body/casing by means of a dedicated channel.

6. The apparatus according to claim 5, wherein the second connection section for discharging the gas of the second sub-chamber of the motorization chamber and the first connection section for the gas inlet into the first sub-chamber are configured such that the gas escaping from said second sub-chamber occurs more slowly than when the gas is fed/drawn into the first sub-chamber of the motorization chamber.

7. The apparatus according to claim 5, wherein said second fluidic connection section comprises at least one passage channel and/or nozzle for limiting the outflow from the second sub-chamber, also causing a drop in gas pressure.

8. The apparatus according to claim 1, wherein the apparatus is configured such that the power of the first sub-chamber with the gas in the inlet area and/or with the gas in the inlet duct the apparatus itself is slower than the feeding of the pilot regulator by means of the gas present in said first sub-chamber, thus causing an emptying of said first sub-chamber.

9. The apparatus according to claim 1, wherein a section of a first fluidic connection section supplying said first sub-chamber has, at least in part, a lower passage section than the duct which connects said first sub-chamber to the inlet of the pilot regulator, or a nozzle is provided.

10. The apparatus according to claim 1, wherein the surface development of the first face of the movable wall facing the first sub-chamber is greater than the face of the shutter facing the inlet area, to thus increase the seal of the shutter when in the closed position.

11. The apparatus according to claim 1, further comprising a further regulator which at one inlet is connected to said first motorization sub-chamber and which at one outlet is connected to the inlet of the pilot regulator and by the fact that said further regulator comprises a valve configured to define/set the pressure at the outlet of said further regulator on the basis of:
   a predefined pressure, and
   the gas pressure leaving the pilot regulator.

12. The apparatus according to claim 11, wherein said further regulator is configured to operate as a reducer of the inlet pressure to the pilot regulator, said further regulator comprising:
   a section which is connected to the inlet and which is configured to cause a reduction in the pressure of the gas entering the regulator itself from the inlet, drawing from the first sub-chamber of the motorization chamber,
   an internal chamber in which a movable member is housed which divides said internal chamber into a first zone and into a second zone which always remain fluidly separated from each other,
and wherein:
   the first zone is in fluidic connection with the outlet of the pilot regulator, inside the first zone being housed said elastic means acting on said movable member in added to the thrust action given by the pressure of the gas entering the first zone exiting the pilot regulator, and
   the second zone is fluidically connected with the pressure reduction section and with the inlet of the pilot regulator.

13. The apparatus according to claim 11, wherein said predefined pressure is defined by the thrust of elastic means provided in said further regulator.

14. The apparatus according to claim 1, further comprising a branch which directly connects the outlet area and/or the cavity obtained in the body/casing of the main regulator with a control input of the pilot regulator, to thus allow the entry into said pilot regulator of the gas which is provided in correspondence with said outlet area and/or said cavity and which is configured to act on said pilot valve of the pilot regulator.

15. The apparatus according to claim 1, wherein:
   said means, which are configured to push said shutter towards said closed position, comprise an elastic element
   said movable element comprises a movable wall, and
   said one intermediate element comprises a rod.

16. Apparatus for regulating gas pressure, of the type suitable for use and installed in systems and/or networks for transport and/or distribution of gas, said apparatus configured to be connected upstream with an inlet duct for the gas in said apparatus and downstream with an outlet duct, the apparatus comprising:
   a main regulator comprising:
      an inlet area fluidically connectable with said inlet duct,
      an outlet area fluidically connectable with said conduit outlet,
      a shutter which acts between said inlet area and said outlet area and which is movable between a closed position, in which the shutter interrupts the passage of gas from said inlet area towards said outlet area, and at least one opening position in which the shutter defines a reduction of a gas passage section from the inlet area to said outlet area, thus causing a corresponding reduction in gas pressure to be said inlet area to said outlet area,
      means, which are configured to push said shutter towards said closed position,
      a motorization chamber in which a movable element is housed, which divides the chamber into a first sub-chamber and a second sub-chamber, said first sub-chamber being fluidly connected with the inlet area and/or connectable with said inlet duct, said second sub-chamber being fluidly connected with the outlet area and/or connectable with said outlet duct to said apparatus, said movable wall and said shutter being integral with each other in translation,
   a pilot regulator comprising:
      an inlet which is fluidically connected with said first sub-chamber, to thus allow the passage of gas from said first sub-chamber towards said inlet of the pilot regulator,
      an outlet which is fluidically connected to said second sub-chamber,
      at least one pilot valve which regulates the passage of gas from the inlet to the outlet of said pilot regulator,
   said pilot regulator is configured such that the closing and the degree of opening of said pilot valve is controlled on the basis of the difference between a calibration pressure, and the gas pressure in correspondence with said outlet area and/or the outlet duct to said apparatus, said main regulator is configured so that the gas pressure in said second sub-chamber, and which comes from the pilot regulator, acts on the movable wall of the motorization chamber so as to move said shutter towards said opening condition, while the gas pressure in said first sub-chamber acts on the movable wall of the motorization chamber so as to move said shutter towards said closing condition,
      wherein said first sub-chamber of the motorization chamber is in communication with the inlet area and/or with the inlet duct by means of a first fluidic connection section which is obtained inside the body/casing of the main regulator,
      and wherein the apparatus further comprises at least one intermediate element, which is fixed and/or rests and/or is in one piece with the shutter and with the movable wall, wherein said first fluidic connection section is defined by a passage duct which passes through said at least one intermediate element, to thus put the fluidic communication area in fluid communication with the inlet area with the first sub-chamber of the motorization chamber.

17. Apparatus for regulating gas pressure, of the type suitable for use and installed in systems and/or networks for transport and/or distribution of gas, said apparatus configured to be connected upstream with an inlet duct for the gas in said apparatus and downstream with an outlet duct, the apparatus comprising:
   a main regulator comprising:
      an inlet area fluidically connectable with said inlet duct,
      an outlet area fluidically connectable with said conduit outlet,
      a shutter which acts between said inlet area and said outlet area and which is movable between a closed position, in which the shutter interrupts the passage of gas from said inlet area towards said outlet area, and at least one opening position in which the shutter defines a reduction of a gas passage section from the inlet area to said outlet area, thus causing a corresponding reduction in gas pressure to be said inlet area to said outlet area,
      means, which are configured to push said shutter towards said closed position,
      a motorization chamber in which a movable element is housed, which divides the chamber into a first sub-chamber and a second sub-chamber, said first sub-chamber being fluidly connected with the inlet area and/or connectable with said inlet duct, said second sub-chamber being fluidly connected with the outlet area and/or connectable with said outlet duct to said apparatus, said movable wall and said shutter being integral with each other in translation, a pilot regulator comprising:
 an inlet which is fluidically connected with said first sub-chamber, to thus allow the passage of gas from said first sub-chamber towards said inlet of the pilot regulator,
 an outlet which is fluidically connected to said second sub-chamber,
 at least one pilot valve which regulates the passage of gas from the inlet to the outlet of said pilot regulator,
 said pilot regulator is configured such that the closing and the degree of opening of said pilot valve is controlled on the basis of the difference between a calibration pressure, and the gas pressure in correspondence with said outlet area and/or the outlet duct to said apparatus, said main regulator is configured so that the gas pressure in said second sub-chamber, and which comes from the pilot regulator, acts on the movable wall of the motorization chamber so as to move said shutter towards said opening condition, while the gas pressure in said first sub-chamber acts on the movable wall of the motorization chamber so as to move said shutter towards said closing condition, and wherein said first sub-chamber of the motorization chamber is in communication with the inlet area and/or with the inlet duct by means of a first fluidic connection section,
 the second sub-chamber of the motorization chamber is in communication with the outlet area and/or with the outlet duct by means of a second fluidic connection section, and wherein the second connection section for discharging the gas of the second sub-chamber is configured in such a way as to have flow losses higher than those of the first connection section for the supply/draft of the gas within the first sub-chamber of the motorization chamber.

18. Method for passing an apparatus according to claim 1, from a first operating type, which leads to complete closure of the shutter of the main regulator in case of malfunction of the piloting of the pilot regulator, to a second operating type, which brings the shutter of the main regulator to full opening in case of malfunction of the pilot valve of the pilot regulator, act on the pilot regulator only by applying:
 a first narrowing of section or a first nozzle in correspondence with the control input of the pilot regulator from which gas enters at the pressure $P_{out}$ provided in correspondence with said outlet area and/or said outlet duct,
 a second section narrowing or a second nozzle in correspondence with a dedicated hole in communication with the external environment, for the inlet of air at atmospheric pressure, and, that correspondingly, to pass from the second operating type to the first operating type, only the pilot regulator is operated by removing:
 said first section narrowing or said first nozzle provided at the control input of the pilot regulator from which gas enters at the pressure Pout provided at said outlet area and/or said outlet duct,
said second section narrowing or said second nozzle provided in correspondence with said dedicated hole in communication with an external environment, for an inlet of air at atmospheric pressure.

* * * * *